Dec. 29, 1942.  T. W. KOERNER  2,306,702
REFRIGERATING APPARATUS
Filed July 5, 1940
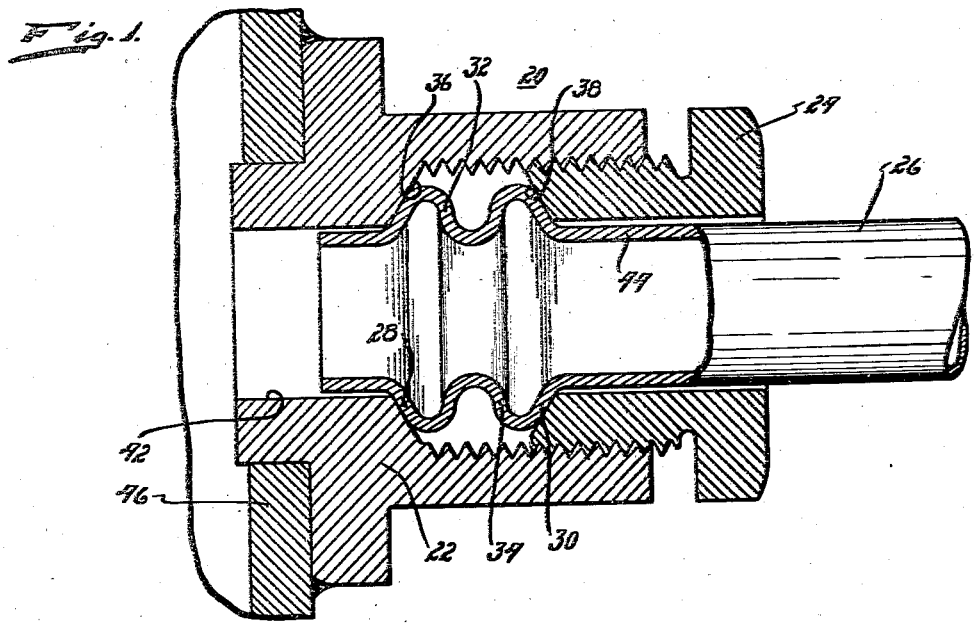
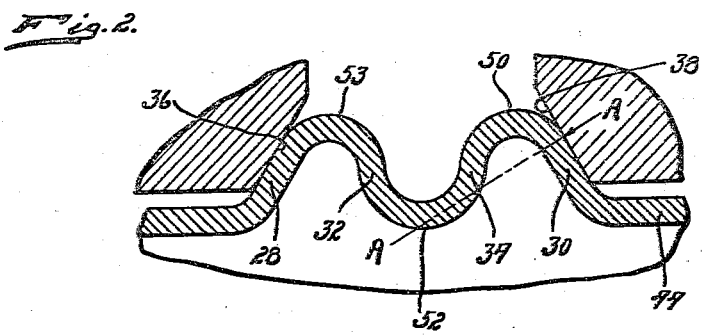
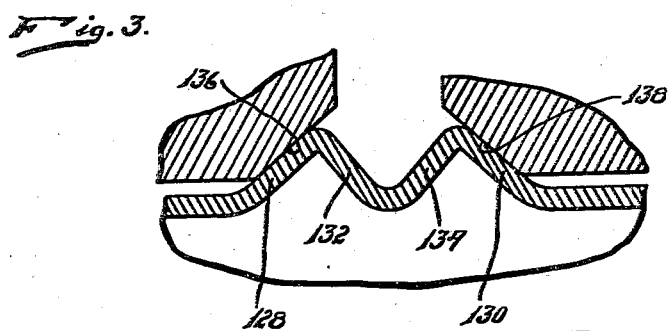
INVENTOR.
THEODORE W. KOERNER
BY Ralph E. Baker
ATTORNEY.

Patented Dec. 29, 1942

2,306,702

UNITED STATES PATENT OFFICE 2,306,702

REFRIGERATING APPARATUS

Theodore W. Koerner, Detroit, Mich., assignor to Nash-Kelvinator Corporation, Detroit, Mich., a corporation of Maryland Application July 5, 1940, Serial No. 343,985

2 Claims. (Cl. 285—90)

This invention relates to refrigerating apparatus and more particularly to a joint or fluid connection for use in connection with refrigerating systems.

One of the objects of my invention is to provide a new and improved fluid connection device wherein the parts may be quickly assembled to form an effective seal without damage to the sealing surfaces or parts of the device.

Another object of my invention is to provide a new and improved fluid connection device wherein a flexible tube is corrugated to provide sealing surfaces and yieldable material to avoid damage to the sealing surfaces when the sealing surfaces are being engaged to form effective seals.

Further objects and advantages of the present invention will be apparent from the following description, reference being had to the accompanying drawing, wherein a preferred form of the preset invention is clearly shown.

In the drawing:

Fig. 1 is a view in cross section of a device embodying features of my invention;

Fig. 2 is an enlarged fragmentary view of a portion of the apparatus shown in Fig. 1; and Fig. 3 is a modified form of device showing a view similar to that shown in Fig. 2.

In accordance with my invention I provide a fluid connection device which includes a flexible conduit or tube having inclined or angular surfaces which are engaged by coupling members to provide fluid sealing surfaces. I have found by making the tube flexible and providing it with angular surfaces it is possible to effect good sealing without damage to the inclined surfaces of the tubing which are engaged by securing or coupling members.

Referring to the drawing, the numeral 20 designates, in general, my improved fluid connection which comprises, in general, a stationary coupling member 22 which receives a movable coupling member 24. These two coupling members are provided with screw threads for securing the two coupling members together. The coupling members are arranged to act upon a flexible tube 26. Preferably the tube is constructed of annealed copper and is to some extent flexible when the coupling members engage surfaces of the tube. Such surfaces include opposed inclined surfaces 28 and 30. As will be noted, the tube 26 is corrugated so as to provide such surfaces and also includes intermediate inclined surfaces 32 and 34, which, due to the flexibility of the tubing, tend to move towards each other when the coupling member 24 is screwed into the coupling member 22 and causes these coupling members to apply their forces upon the inclined surfaces 28 and 30. The coupling member 22 is provided with an inclined surface 36 which is adapted to cooperate with inclined surface 28 of tube 26 and the coupling member 24 is provided with an inclined surface 38 which is adapted to cooperate with inclined surface 30 of tube 26. It will therefore be apparent that when coupling member 24 is screw threaded into the coupling member 22 the surfaces 36 and 38 of the coupling members tend to compress the portion of the tube 26 which lies between such surfaces. At the same time the tube is being somewhat compressed the surfaces 36 and 28 cooperate to form an effective seal while the surfaces 38 and 30 cooperate to form a second effective seal. By this arrangement the tube 26 is securely clamped to the coupling member 22 and also is sealed so that fluid which may tend to pass through bore 42 of coupling member 22 must pass into the interior 44 of tube 26 because of the sealing surfaces between the coupling members and the tube.

Coupling 22 may be secured to any device of a refrigerating system for example such as wall 46. The wall 46 may be a wall of any of the conventional type casings or vessels used in refrigerating systems as is well known in the art. It is to be noted that this device forms an effective seal without the aid of fusion or the like. It will also be noted that the sealing surfaces may be engaged without the possibility of a service man adjusting the coupling member 24 so that it would tend to destroy the copper tubing. This is accomplished because there is a certain amount of yield to the walls 32 and 34 of the tube 26. Consequently if the coupling member 24 is inserted a trifle too far into the coupling member 22 the walls 32 and 34 tend to yield rather than to have the inclined surface 38 of coupling 24 gouge into the wall 30 of the tube 26.

In Fig. 2 which is an enlarged view of the portion of the apparatus shown in Fig. 1, it will be noted that the surface 38 tends to apply its pressure upon the tube in the direction of the line designated A—A tending to cause the tube to yield along the points 50, 52 and 53. In the embodiment disclosed in Fig. 3 it will be noted the tube is provided with walls 128, 130, 132 and 134 which correspond to walls 28, 30, 32 and 34 of the device shown in Figs. 1 and 2. However, these walls are designed on different angles so that inclined surfaces 136 and 138 which correspond to surfaces 36 and 38 of Fig. 1 tend to apply their force on a different angle than that which is shown in Figs. 1 and 2. For example, the surface 138 is placed at substantially right angles to the wall 134 and surface 136 is placed at substantially right angles to the wall 132. While the compressing action is somewhat similar, it will be noticed that the pressure which is exerted upon the corrugations is somewhat different and in some instances it is found desirable to use the type of corrugations shown in Fig. 3 instead of that which is shown in Fig. 2.

Although only a preferred form of the invention has been illustrated, and that form described in detail, it will be apparent to those skilled in the art that various modifications may be made therein without departing from the spirit of the invention or from the scope of the appended claims.

I claim:

1. A fluid connection device comprising a flexible tube having two annular beads formed thereon to present two sets of spaced apart opposed inclined surfaces with one set lying on the outside of the other set, a coupling member having a surface bearing against one of said outside opposed surfaces, a second coupling member arranged to apply its force against the other of said outside opposed surfaces and means for urging said members toward each other to effect a seal between the surfaces of the said coupling members and said opposed outside inclined surfaces while the opposed inside set of inclined surfaces tend to yield toward each other due to the flexibility of the tube.

2. A fluid connection device comprising a tube having two oppositely inclined surfaces formed in the wall of said tube and extending about the circumference of said tube in spaced relationship to each other, said surfaces being joined by a flexible connection formed in the wall of said tube so that said surfaces may readily assume different angles of inclination, a coupling member having an annular surface bearing against one of said surfaces, a second coupling member having an annular surface bearing against the other of said inclined surfaces and means for urging said members toward each other against said inclined surfaces whereby said inclined surfaces are tilted into face to face relation with the annular surfaces of said coupling members to form annular seals therewith.

THEODORE W. KOERNER.